United States Patent
Domenico

Patent Number: 5,829,321
Date of Patent: Nov. 3, 1998

[54] METHOD FOR MANUFACTURING A SAFETY KNIFE

[75] Inventor: Anthony J. Domenico, Moreno Valley, Calif.

[73] Assignee: Square One Parachutes, Inc., Perris, Calif.

[21] Appl. No.: 779,104

[22] Filed: Jan. 6, 1997

[51] Int. Cl.⁶ ........................ B26B 3/00
[52] U.S. Cl. .............. 76/104.1; 30/294; 30/298.4
[58] Field of Search ............... 76/101.1, 104.1, 76/119; 30/294, 298.4, 340, 342, DIG. 3, 303

[56] References Cited

U.S. PATENT DOCUMENTS

| | | |
|---|---|---|
| 1,472,826 | 6/1923 | Champlin . |
| 3,365,798 | 1/1968 | Cunningham .................. 30/294 X |
| 3,370,163 | 2/1968 | Brill . |
| 3,710,444 | 1/1973 | Fishman .................. 30/294 X |
| 4,134,206 | 1/1979 | Beermann .................. 30/294 |
| 4,680,861 | 7/1987 | Meurer .................. 30/298.4 |
| 4,783,867 | 11/1988 | Tsao . |
| 4,918,775 | 4/1990 | Leu . |
| 5,282,316 | 2/1994 | Anderson .................. 30/294 |
| 5,313,376 | 5/1994 | McIntosh . |

*Primary Examiner*—Douglas D. Watts
*Attorney, Agent, or Firm*—Nydegger & Associates

[57] ABSTRACT

A method for manufacturing a safety/rescue knife requires the forming of four blank laminates. Each blank laminate has a handle portion and includes a base arm which is attached to the handle portion. Also, each blank laminate has an extension arm which extends from the base arm to define a groove therebetween. One blank laminate is further formed with a cut out in its base arm, and another blank laminate is further formed with a cut out in its extension arm. The method then requires aligning each of the cut out laminates with a respective blank laminate to create blade recesses. Next, cutting blades are placed in the recesses, and the cut out laminates are juxtaposed in alignment. The blank laminates are then connected together to hold the inner laminates and the blades therebetween with the blades crossed to establish a cutting angle in the groove.

12 Claims, 2 Drawing Sheets

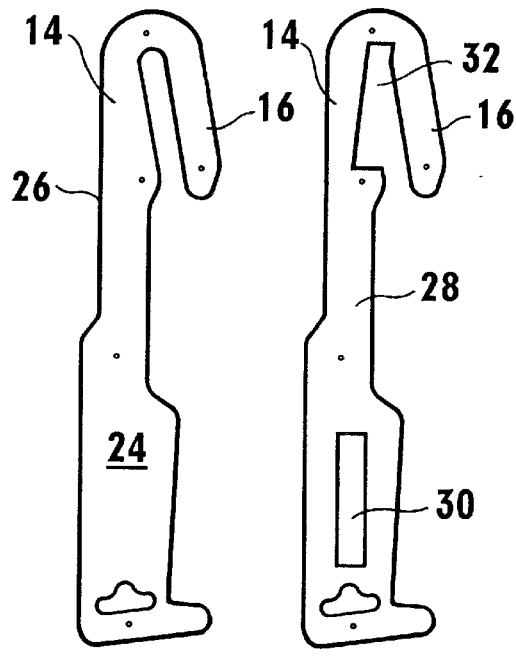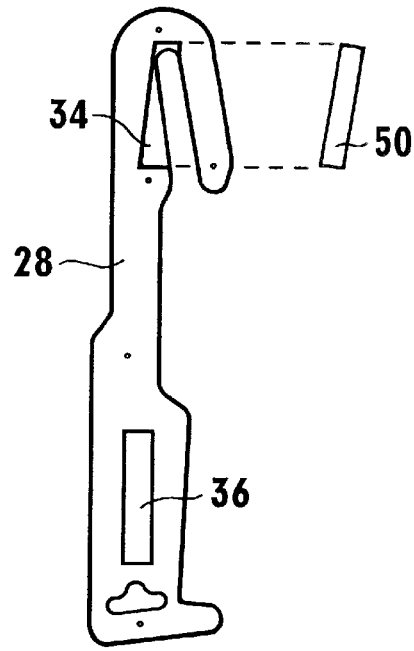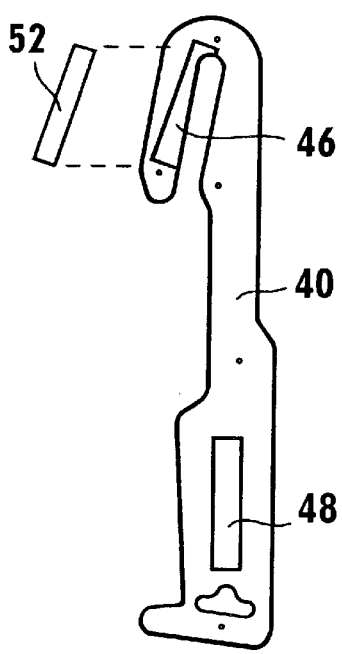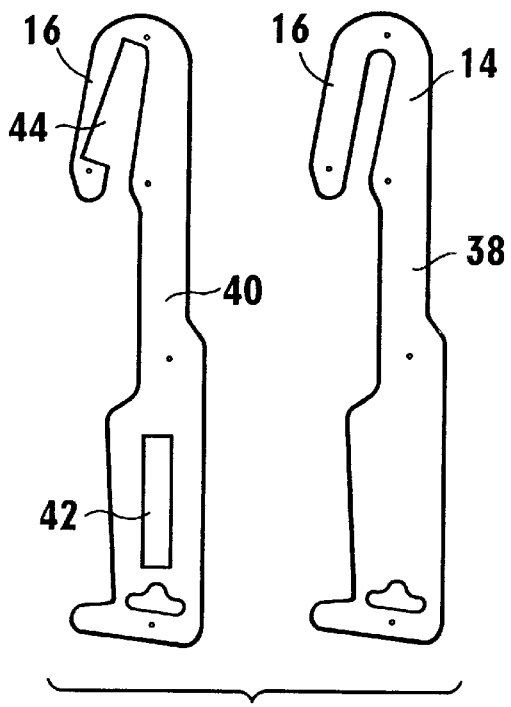
Fig. 2A
Fig. 2B
Fig. 3B
Fig. 3A

METHOD FOR MANUFACTURING A SAFETY KNIFE

FIELD OF THE INVENTION

The present invention pertains generally to methods for manufacturing knives. More particularly, the present invention pertains to methods for manufacturing safety/rescue knives which have protected cutting blades. The present invention is particularly, but not exclusively, useful for manufacturing safety/rescue knives by using a plurality of essentially similar components.

BACKGROUND OF THE INVENTION

Safety/rescue knives have several features which distinguish them from other type knives. One such feature results from the fact that safety/rescue knives are intended to be used for the purpose of extricating someone who is unwillingly being restrained or otherwise confined. Accordingly, safety/rescue knives are generally used to cut straps, lines, or sheets of material that may prevent movement by a person who, for whatever reason, is unable to do so on their own. Additionally, for those able to manipulate a knife, a safety/rescue knife can be a great assistance in extricating oneself from that might otherwise be a life threatening situation.

Due to the limited purposes for which safety/rescue knives are to be used, the cutting elements of such devices can be very specifically designed. Specifically, because straps, lines and sheets all present a relatively thin edge, as long as the cuffing element can access this relatively thin edge, the safety/rescue knife will be effective for its intended purpose. This fact allows the safety/rescue knife to be configured with a rather small access into the cutting element. Thus, so long as there is also a sufficient handle portion with which the operator can control the cutting element, the safety/rescue knife will be effective.

Another factor for consideration is that the blades of a safety/rescue knife can be broken or dulled during their use in rescue operations. If so, it may be necessary that they be quickly replaced.

In light of the above, it is an object of the present invention to provide a method for manufacturing a safety/rescue knife which can be easily disassembled and reassembled by the operator. Another object of the present invention is to provide a method for manufacturing a safety/rescue knife which efficiently uses a minimal number of essentially similar subcomponents. Still another object of the present invention is to provide a method for manufacturing a safety/rescue knife which is simple to implement and comparatively cost effective.

SUMMARY OF THE PREFERRED EMBODIMENTS

A method for manufacturing a safety/rescue knife involves initially forming a plurality of blank laminates. Each of these blank laminates has a handle portion with a base arm attached thereto and with an extension arm extending from the base arm. More specifically, the extension arm is oriented to define a groove between the base arm and the extension arm.

For the method of assembly/manufacture in accordance with the present invention, one fourth of the blank laminates are selected and formed with a cut out in the base arm. These particular cut out laminates will hereinafter be designated as left inner laminates. Another one fourth of the blank laminates are selected and formed with a cut out in the extension arm. These particular cut out laminates will hereinafter be designated as right inner laminates. All of these selected cut out laminates are formed with an opening in the handle portion of the laminate. Further, the remaining one half of the blank laminates will be remain unaltered.

Assembly of the safety/rescue knife of the present invention requires aligning a left inner laminate with a blank laminate to create a blade recess with the cut out. A cutting blade is then placed in the recess. Next, the right inner laminate is aligned with a blank laminate to create a blade recess with its cut out. Again, a cutting blade is placed into the created recess. The left and right inner laminates are then juxtaposed in alignment, and the outer blank laminates are connected to each other.

By connecting the outer blank laminates to each other, while the inner laminates and the blades are held therebetween, the blade in the recess of the left inner laminate is crossed over the blade in the recess of the right inner laminate. This crossing creates a cutting element with a cutting angle between the blades in the groove of the safety/rescue knife. Additionally, with this connection the opening in the left inner laminate is aligned with the opening in the right inner laminate to create a storage compartment in which additional blades can be stored.

Connection of the outer blank laminates is preferably accomplished with a bolting mechanism which can be easily connected and disconnected. Specifically, it is intended that easy assembly and disassembly of the safety/rescue knife will allow access to the blades which are held in the storage compartment. The stored blades can then be used for removal and replacement of damaged or dulled blades in the cutting element.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
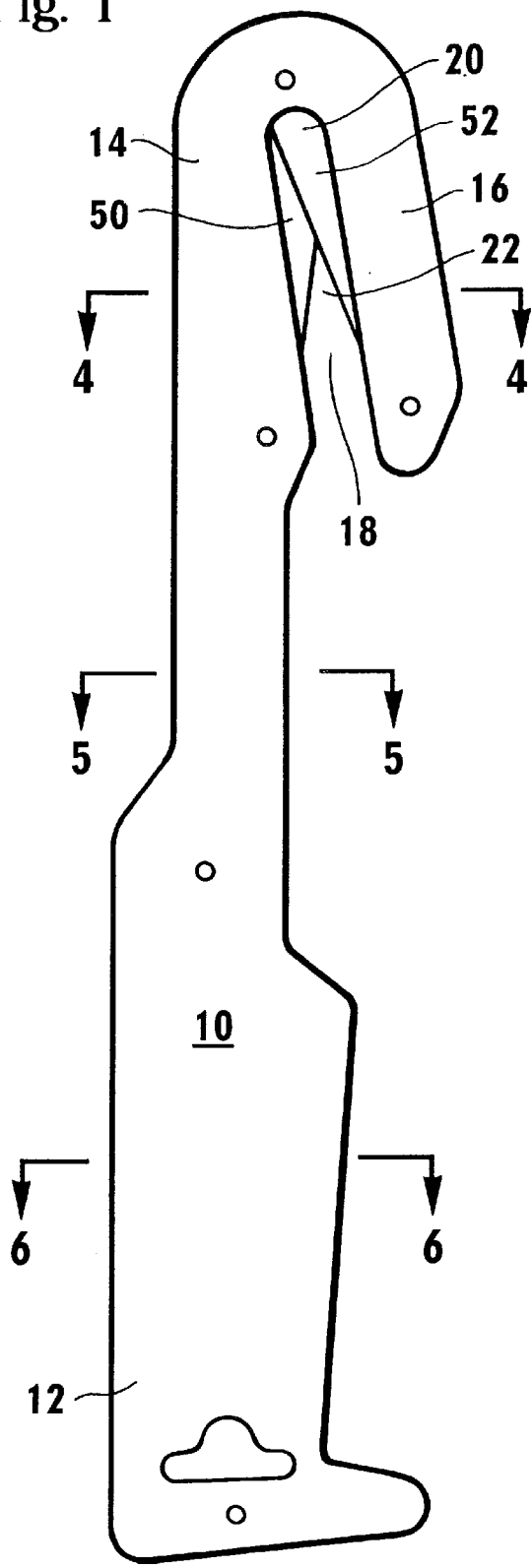
FIG. 1 is a right side elevation view of the rescue/safety knife according to the present invention.

Referring initially to FIG. 1, a safety/rescue knife in accordance with the present invention is shown and generally designated 10. As shown in FIG. 1, knife 10 has a handle 12 with a base arm 14 which extends from the handle 12. Further, an extension arm 16 extends from the base arm 14 and curves from the base arm 14, substantially, as shown, to establish a groove 18 between the base arm 14 and the extension arm 16. A cutting element 20 is held in the groove 18 to create a cutting angle 22. In the use of the knife 10, an article that is to be cut (e.g. a cloth strap or line—not shown) is positioned against the cutting angle 22 in groove 18. The knife 10 is then pulled by the handle 12 so that the cutting element 20 severs the article.

For the manufacture of a safety/rescue knife 10, it is first necessary to generate a plurality of laminates (at least four) which are all similarly shaped. For purposes of disclosure and differentiation of the various laminates 24 which are to be used for the manufacture and assembly of knife 10, the specific laminate which has been designated 24 in FIG. 2A is hereinafter referred to as the left outer laminate 26. As will be better appreciated from subsequent disclosure, all sublaminates begin as a laminate 24. Some of the laminates 24, however, are modified.

Still referring to FIG. 2A, it will be seen that in addition to the left outer laminate 26, there is also shown a left inner laminate 28. More specifically, the left inner laminate 28 differs from the left outer laminate 26 in that the left inner laminate 28 is formed with an opening 30, which is positioned in its handle 12, and it has a cut out 32, which is formed in its base arm 14.

FIG. 2B shows that when the left inner laminate 28 is positioned over and against the left outer laminate 26, the cut out 32 of the left inner laminate 28 and the base arm 14 of left outer laminate 26 form a recess 34. Similarly, the opening 30 of left inner laminate 28 and the handle 12 of left outer laminate 26 form a storage compartment 36.

Referring now to FIG. 3A, it will be seen that in addition to a right outer laminate 38, there is also a right inner laminate 40. More specifically, the right inner laminate 40 differs from the right outer laminate 38 in that the right inner laminate 40 is formed with an opening 42, which is positioned in its handle 12, and it has a cut out 44, which is formed in its extension arm 16.

FIG. 3B shows that when the right inner laminate 40 is positioned over and against the right outer laminate 38, the cut out 44 of the right inner laminate 40 and the extension arm 16 of right outer laminate 38 form a recess 46. Similarly, the opening 42 of right inner laminate 40 and the handle 12 of right outer laminate 38 form a storage compartment 48.

Referring back to FIG. 2B, it will be seen that a blade 50 is insertable into the recess 34. Similarly, as shown in FIG. 3B, a blade 52 is insertable into the recess 46. Though not shown, it will be appreciated by the skilled artisan that additional blades can be held in the storage compartments 36,48 for future use on an as-needed basis.

Final assembly of the safety/rescue knife 10 is accomplished by juxtaposing the right inner laminate 40 (subcomponent shown in FIG. 3B) over and against the left inner laminate 28 (subcomponent shown in FIG. 2B). When this is done with proper alignment of the respective handles 12, base arms 14 and extension arms 16, the result is a knife 10. Further, with this combination the blades 50 and 52 will be crossed to create the cutting element 20 that is seen in groove 18 of knife 10.

Figure 4:
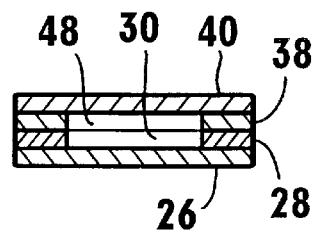
FIG. 4 is a cross-sectional view of the rescue/safety knife as seen along the line 4—4 in FIG. 1.
Figure 1:
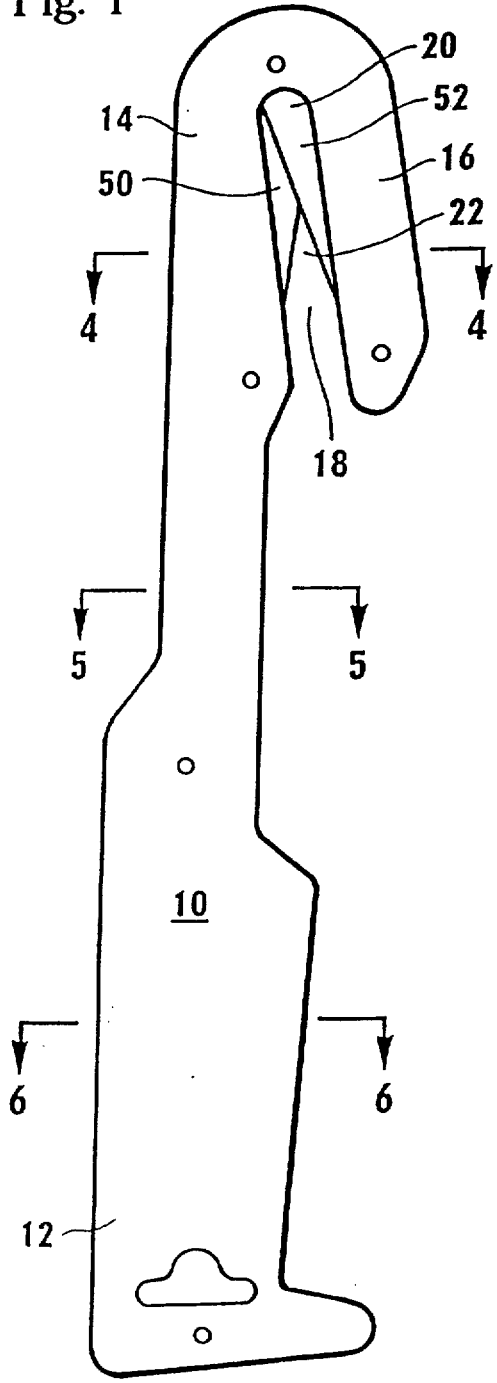
Figure 4:
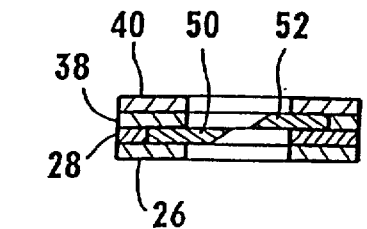
Figure 5:
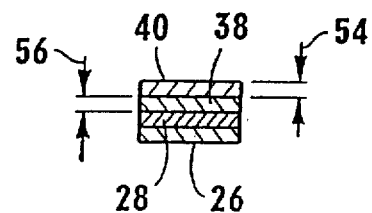
FIG. 5 is a cross-sectional view of the rescue/safety knife as seen along the line 5—5 in FIG. 1.
Figure 6:
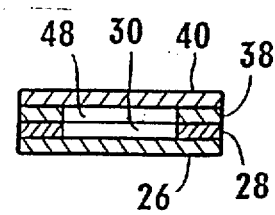
FIG. 6 is a cross-sectional view of the rescue/safety knife as seen along the line 6—6 in FIG. 1.

To maintain operational integrity of the knife 10, the right outer laminate 38 needs to be connected directly to the left outer laminate 26. Of course, as indicated above, through this connection the left inner laminate 28 and right inner laminate 40 must be held between the respective outer laminates 26,38. The structure of the resultant knife 10 can perhaps be appreciated in greater detail by referring to FIGS. 4, 5 and 6. These Figures, in cross-sectional views, show the relationship between the right outer laminate 38, the right inner laminate 38, the left inner laminate 28 and the left outer laminate 26. More specifically, FIG. 4 shows how the blades 50 and 52 are held in their respective recesses 34,46 to create cutting element 22. FIG. 5 shows the general layering of the laminates 24 and shows through the dimensional indicators 54 and 56 that all of the laminates 24 are preferably of about the same thickness. And, FIG. 6 shows how the laminates 24 combine to form the storage compartments 48 and 30 which can be used to store additional blades 50 and 52.

OPERATION

While the particular Method for Manufacturing a Safety Knife as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a safety/rescue knife which comprises the steps of:

positioning a left inner laminate in alignment over a left outer laminate to create a first blade recess;

positioning a right inner laminate in alignment over a right outer laminate to create a second blade recess;

placing a first blade in said first blade recess;

placing a second blade in said second blade recess;

juxtaposing said left inner laminate in alignment with said right inner laminate; and connecting said left outer laminate to said right outer laminate to hold said first blade in said first blade recess against said second blade in said second blade recess.

2. A method as recited in claim 1 further comprising the step of crossing said first blade over said second blade during said juxtaposing step to create a cutting angle.

3. A method as recited in claim 1 further comprising the step of forming said left inner laminate and said right inner laminate with a respective opening, said openings being formed to cooperatively establish a blade storage compartment during said juxtaposing step.

4. A method as recited in claim 1 wherein said connecting step is accomplished by bolting.

5. A method as recited in claim 1 wherein said left outer laminate, said left inner laminate, said right outer laminate and said right inner laminate are each formed with a respective base arm and with an extension arm, each said extension arm being oriented relative to each respective said base arm to define a groove therebetween.

6. A method as recited in claim 5 further comprising the steps of:

forming a cut out into said base arm of said left inner laminate to create said first blade recess; and forming a cut out into said extension arm of said right inner laminate to create said second blade recess.

7. A method as recited in claim 5 further comprising the step of crossing said first blade over said second blade during said juxtaposing step to create a cutting angle therebetween in said groove.

8. A method as recited in claim 5 further comprising the step of forming said left inner laminate and said right inner laminate with a respective opening, said openings being formed to cooperatively establish a blade storage compartment during said juxtaposing step.

9. A method as recited in claim 5 wherein said connecting step is accomplished by bolting.

10. A method for manufacturing a safety/rescue knife which comprises the steps of:

forming a plurality of blank laminates, each said blank laminate having a handle, a base arm attached to said handle, and an extension arm extending from said base arm and oriented therewith to define a groove therebetween;

creating a left inner laminate from one of said blank laminates, said left inner laminate being created by forming a cut out into said base arm thereof;

creating a right inner laminate from one of said blank laminates, said right inner laminate being created by forming a cut out into said extension arm thereof;

juxtaposing said left inner laminate in alignment against said right inner laminate;

placing a first blade in said cut out of said left inner laminate and a second blade in said blade placed in said cut out of said right inner laminate to establish a cutting angle between said first and second blades; and connecting one said blank laminate in alignment with another said blank laminate to hold said left inner laminate and said right inner laminate therebetween with said cutting angle in said groove.

11. A method as recited in claim 10 further comprising the step of forming said left inner laminate and said right inner laminate with a respective opening, said openings being formed to cooperatively establish a blade storage compartment during said juxtaposing step.

12. A method as recited in claim 10 wherein said connecting step is accomplished by bolting.

\* \* \* \* \*

UNITED STATES PATENT AND TRADEMARK OFFICE
CERTIFICATE OF CORRECTION

Figure 2:
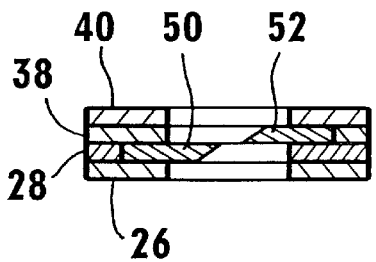
FIG. 2A is a side elevation view of individual laminates which are used in the assembly of the rescue/safety knife of the present invention.
FIG. 2B shows the laminates of FIG. 2A joined together to form a left subcomponent of the rescue/safety knife of the present invention.

PATENT NO. : 5,829,321
DATED : November 3, 1998
INVENTOR(S) : Anthony J. Domenico It is certified that error appears in the above-identified patent and that said Letters Patent is hereby corrected as shown below:

Drawings, Sheet 1 of 2
DELETE reference
[Fig. 2]
INSERT reference
--Fig. 4--

Figure 3:
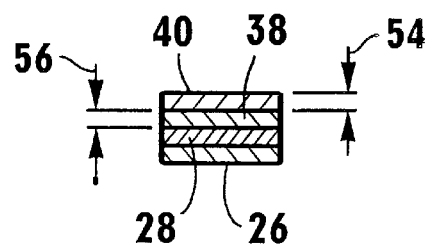
FIG. 3A is a side elevation view of individual laminates which are used in the assembly of the rescue/safety knife of the present invention.
FIG. 3B shows the laminates of FIG. 3A joined together to form a right subcomponent of the rescue/safety knife of the present invention.

Drawings, Sheet 1 of 2
DELETE reference
[Fig. 3]
INSERT reference
--Fig. 5--

Drawings, Sheet 1 of 2
DELETE reference
[Fig. 4]
INSERT reference
--Fig. 6--

Signed and Sealed this

Nineteenth Day of September, 2000

Attest:

Q. TODD DICKINSON

*Attesting Officer*     *Director of Patents and Trademarks*